(12) United States Patent
McClure et al.

(10) Patent No.: US 8,371,097 B1
(45) Date of Patent: Feb. 12, 2013

(54) BALER GATHERING WHEEL HEIGHT ADJUSTMENT

(75) Inventors: John R. McClure, New Holland, PA (US); William Dale Hotaling, New Holland, PA (US); Larry D. Hall, Vero Beach, FL (US); Stephen C. Schlotterbeck, Okeechobee, FL (US); Singh Chandrashekhar, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/244,972

(22) Filed: Sep. 26, 2011

(51) Int. Cl.
*A01D 39/00* (2006.01)
*A01D 43/02* (2006.01)
*A01D 75/00* (2006.01)

(52) U.S. Cl. .......................................... 56/341; 56/362
(58) Field of Classification Search .................. 56/362, 56/314, 341, 375, 400, 364
See application file for complete search history.

(56) References Cited

U.S. PATENT DOCUMENTS

| | | | |
|---|---|---|---|
| 2,459,961 A * | 1/1949 | Pollard | 56/372 |
| 2,783,606 A | 3/1957 | Wilson | |
| 3,125,845 A | 3/1964 | Lee | |
| 3,367,094 A * | 2/1968 | Harwig | 56/364 |
| 3,678,669 A | 7/1972 | Czajkowski | |
| 3,834,142 A | 9/1974 | Johnston et al. | |
| 4,182,103 A | 1/1980 | McNutt | |
| 4,236,372 A * | 12/1980 | Munro et al. | 56/364 |
| 4,446,684 A * | 5/1984 | Frimml et al. | 56/341 |
| 4,446,685 A | 5/1984 | Coeffic | |
| 4,803,832 A * | 2/1989 | Crawford | 56/341 |
| 5,400,578 A * | 3/1995 | Galanti | 56/341 |
| 6,449,936 B1 * | 9/2002 | Anstey et al. | 56/341 |
| 6,543,212 B2 * | 4/2003 | Tonutti | 56/375 |
| 6,594,978 B2 * | 7/2003 | Viaud | 56/10.2 E |
| 7,165,386 B2 | 1/2007 | Tonutti | |
| 7,617,662 B2 | 11/2009 | Erdmann et al. | |
| 2002/0059790 A1 | 5/2002 | Paulsen | |

* cited by examiner

*Primary Examiner* — Arpad Fabian-Kovacs
(74) *Attorney, Agent, or Firm* — Patrick M. Sheldrake

(57) ABSTRACT

A mechanism for connecting outboard gathering wheels to a moveable crop pick-up assembly on a round baler that incorporates a multi-element linkage to enable the rate of vertical movement of the gathering wheels to be different than the rate of vertical movement of the pick-up assembly. As the pick-up assembly is moved vertically by an actuator, the linkage interconnecting the gathering wheels and the pick-up causes the gathering wheels to also move vertically, but at a rate that is different, usually less, than the rate of vertical movement of the pickup. The linkage enables the pick-up to be raised sufficiently for transport without causing the gathering wheels to impinge upon the baler frame as occurs when both are raised at the same rate. Use of tension members in the linkage allows the gathering wheels to up float during operation without damaging the linkage.

14 Claims, 5 Drawing Sheets

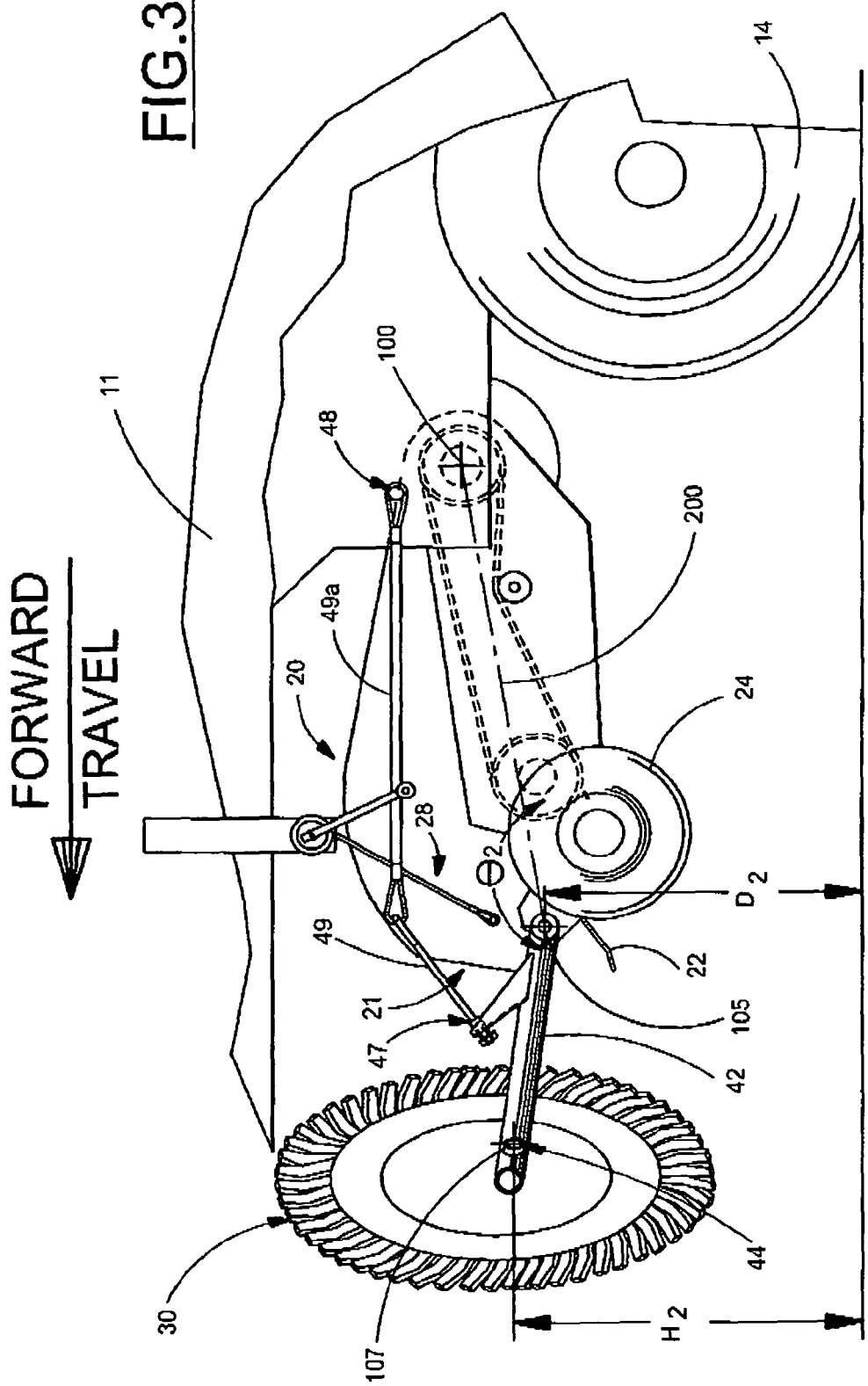

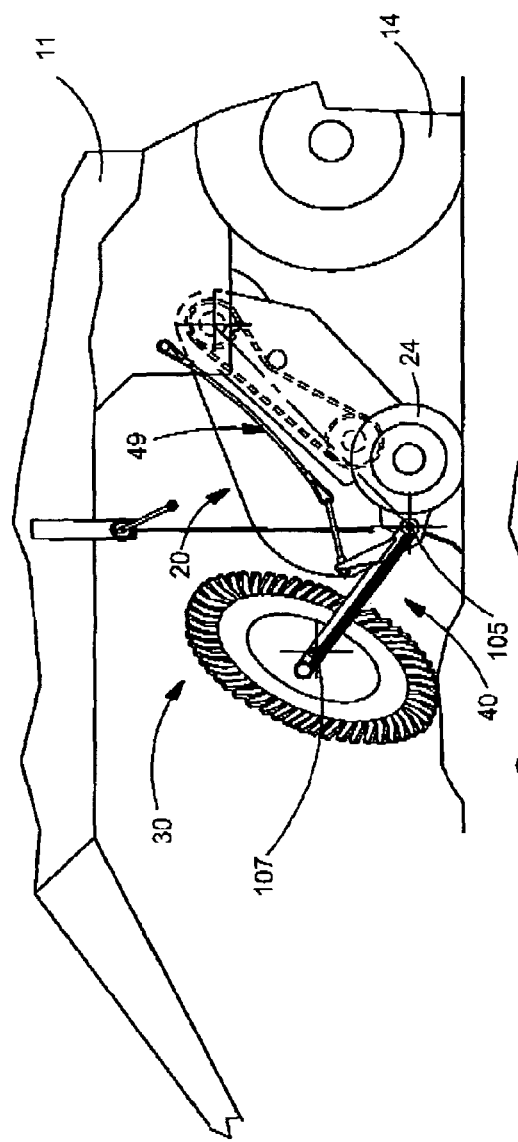
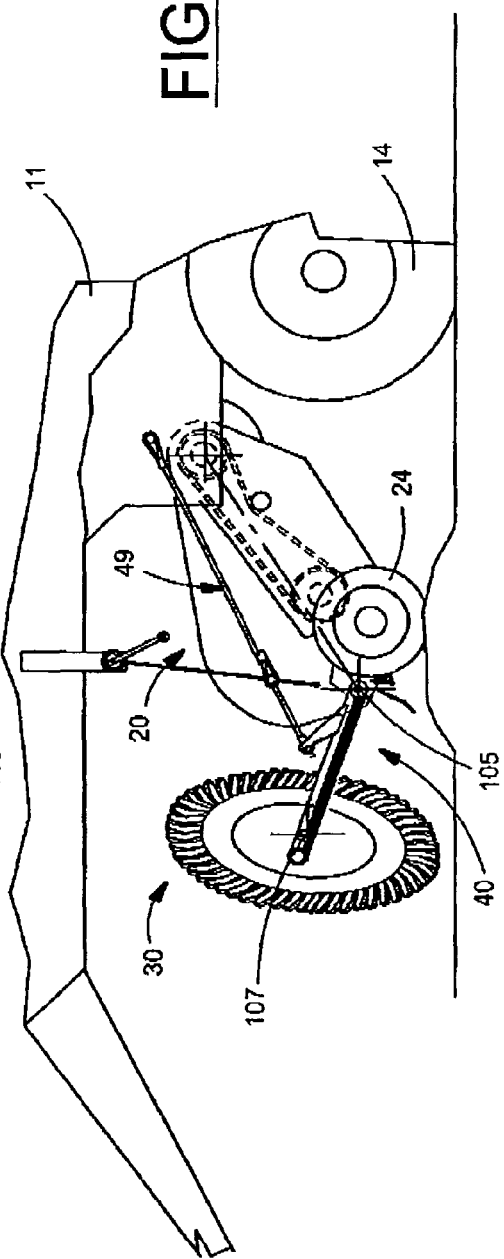

BALER GATHERING WHEEL HEIGHT ADJUSTMENT

BACKGROUND OF THE INVENTION

This invention relates generally to agricultural forage harvesting machines, and, more particularly, to a suspension mechanism for a gathering rake wheel used on a crop pickup assembly.

Some round baler use pickups having the same width as that of the bale chamber. Gathering wheels are commonly used and positioned outboard of the ends of such pickups to increase the gathering width of these relatively narrower pickups. Round baler pickups are required to be moveable between operating and transport positions; such movement is often accomplished by rotating the pickup about a transverse pivot axis. Pickup movement has resulted in gathering wheels being most frequently mounted on the baler frame; however, such a location is not ideal as it places the gathering wheel rearward than ideal. Another solution is to attach the gathering wheels directly to the pickup for movement therewith. The disadvantage in this configuration is that the degree of pickup rotation may be limited due to interferences between the gathering wheels and the baler frame and/or shields which may result in damage to the pickup during transport as the pickup assembly cannot be sufficiently rotated to provide necessary ground clearance.

It would be advantageous to have an improved suspension mechanism for attaching a crop gathering wheel to a crop pickup assembly that enables the gathering wheel to be raised and lowered at a rate differing from that of the pickup assembly. The mechanism would enable the pickup assembly to be raised a greater amount relative to the gathering wheel thereby allowing the pickup to be raised to an extent to provide necessary ground clearance without causing the gathering wheel to interfere with the machine chassis.

SUMMARY OF THE INVENTION

Accordingly, the present invention, in any of the embodiments described herein, may provide one or more of the following advantages:

It is an object of the present invention to provide a mounting mechanism for connecting a gathering wheel to a crop pick-up assembly that enables the pick-up assembly and gathering wheel to be raised and lowered at different rates.

It is a further object of the present invention to provide a mechanism for connecting a gathering wheel to a crop pick-up assembly that allows the gathering wheel to be optimally positioned on the pick-up assembly during operation.

It is a further object of the present invention to provide a mechanism for connecting a gathering wheel to a crop pick-up assembly that repositions the gathering wheel to allow optimal lifting clearance for the pick-up assembly to improve machine transport characteristics.

It is a further object of the present invention to provide a mechanism for connecting a gathering wheel to a moveable pick-up assembly used on an agricultural baler that allows upward float of the gathering wheel as the baler traverses the field and the pick-up is positioned for operation.

It is a still further object of the present invention to provide a mechanism for connecting a gathering wheel to a moveable pick-up assembly on an agricultural machine that easily adaptable to current production crop pick-up assemblies used in agricultural balers and other agricultural equipment using outboard gathering wheels.

It is a still further object of the present invention to provide a mechanism for connecting a gathering wheel to a moveable pick-up assembly on an agricultural machine that is durable in construction, inexpensive of manufacture, carefree of maintenance, easily assembled, and simple and effective to use.

These and other objects are achieved in accordance with the instant invention by providing a mechanism for connecting outboard gathering wheels to a moveable crop pick-up assembly on a round baler that incorporates a multi-element linkage to enable the rate of vertical movement of the gathering wheels to be different than the rate of vertical movement of the pick-up assembly. As the pick-up assembly is moved vertically by an actuator, the linkage interconnecting the gathering wheels and the pick-up causes the gathering wheels to also move vertically, but at a rate that is different, usually less, than the rate of vertical movement of the pickup. The linkage enables the pick-up to be raised sufficiently for transport without causing the gathering wheels to impinge upon the baler frame as occurs when both are raised at the same rate. Use of tension members in the linkage allows the gathering wheels to up float during operation without damaging the linkage.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a side view of the pick-up assembly of FIG. 2 shown with the pick-up assembly in a raised position;

FIG. 4 is a side view of the pick-up assembly shown in FIG. 2 in which the gathering wheel support mechanism is deflected to allow traversing uneven terrain;

FIG. 5 is a side view of the pick-up assembly shown in FIG. 4 in which the gathering wheel has passed the uneven terrain and the pick-up assembly carrier wheel is traversing the uneven terrain.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
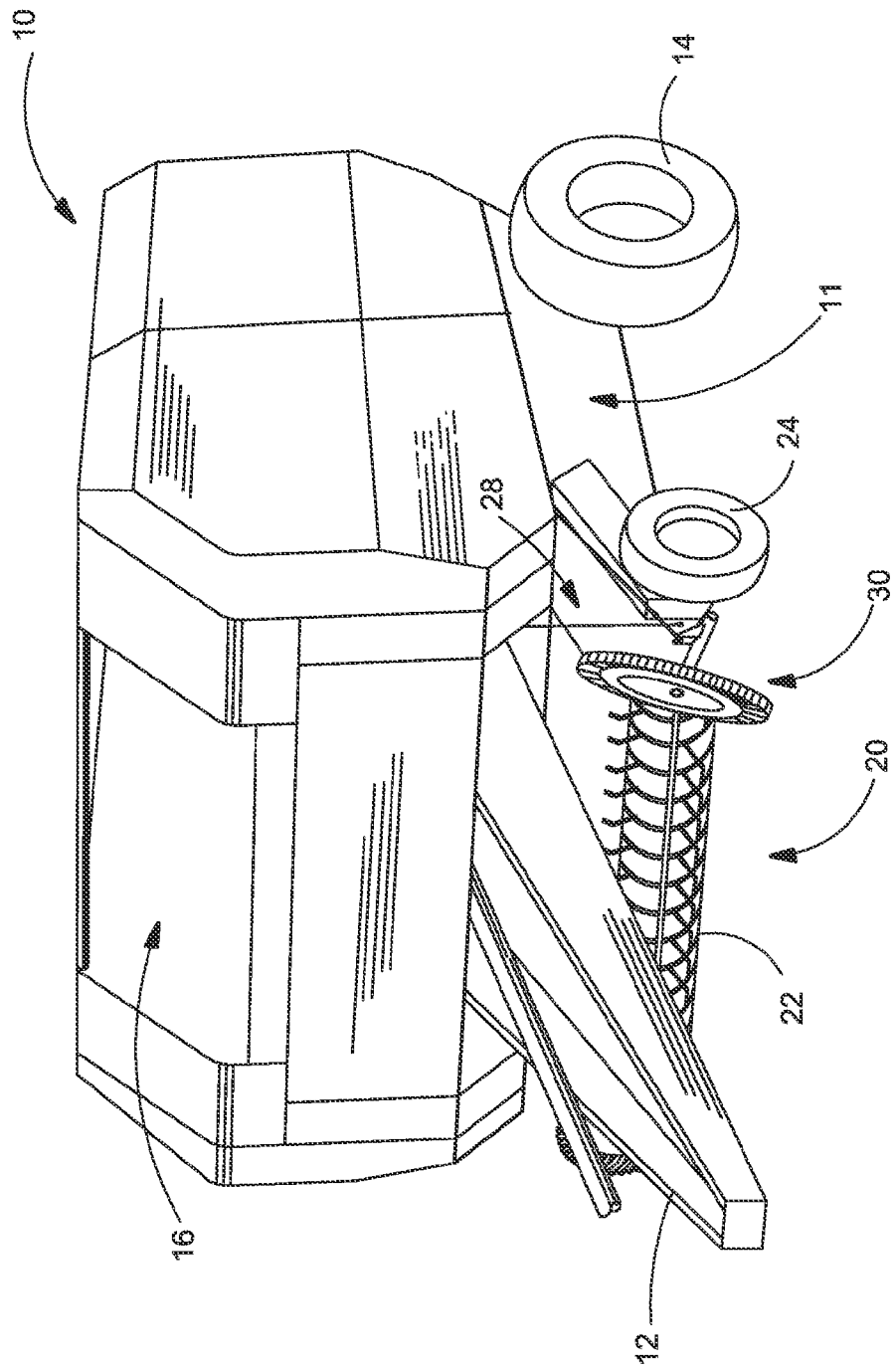
FIG. 1 is a perspective view of an agricultural round baler of the type on which the present invention is useful.

Referring to FIG. 1 where a conventional agricultural round baler 10 is shown to comprise a ground-supported frame 11 with a forwardly extending tongue 12 and a pair of wheels 14 (only one shown) configured to allow the baler to be moved across the ground by a prime mover. A pick-up assembly 20 having a transversely oriented tine reel 22 is connected to the frame 11 at a rearward location and positioned below the frame 11 and forwardly extending tongue 12. The forward end of the pick-up assembly is positioned to gather and convey crop material from the ground (usually in a windrow) to a bale-forming chamber 16. Crop gathering efficiency is often improved on larger balers by providing a pick-up assembly 20 significantly wider than the bale chamber 16 so that larger windrows of crop material may be gathered and fed into the bale chamber. Providing wider crop pick-up assemblies on smaller balers is often cost prohibitive.

The pick-up assembly 20 is vertically moveable, typically by pivoting about a rearwardly disposed transverse and generally horizontal pick-up axis 100 (shown in FIGS. 2 and 3), between a raised position for non-operational transport of the baler and a lowered position for operation. The forward portion of the pick-up assembly is allowed to move vertically during operation to enable the pick-up to follow ground contours. One or more pick-up wheels 24 are connected to the pick-up assembly maintain the forward portion of the pick-up assembly and the tine reel optimally positioned with respect to the ground during operation. A pick-up lift apparatus 28 allows the pick-up assembly to be elevated by pivoting about the pick-up axis 100 to the extent permissible beneath the baler frame 11 to allow the baler to be transported over the road from field to field.

Some smaller balers improve crop gathering efficiency by providing one or more crop gathering wheels 30 connected to the outboard ends of the pick-up assembly 20. The crop gathering wheels 30 are positioned slightly forward of and outwardly angled from the pick-up tine reel 22. The gathering wheels 30 are passively rotated by contact with the ground as the baler moves forwardly to funnel crop inwardly toward the pick-up tine reel 22 where it can be fed into the baler. The crop gathering wheels 30 may be connected to the pick-up assembly in a manner that allows limited movement so that the wheels may follow the ground contour independent of the pick-up assembly as the gathering wheels 30 and the pick-up wheels 24 are typically spaced apart along the travel axis of the baler.

Figure 2:
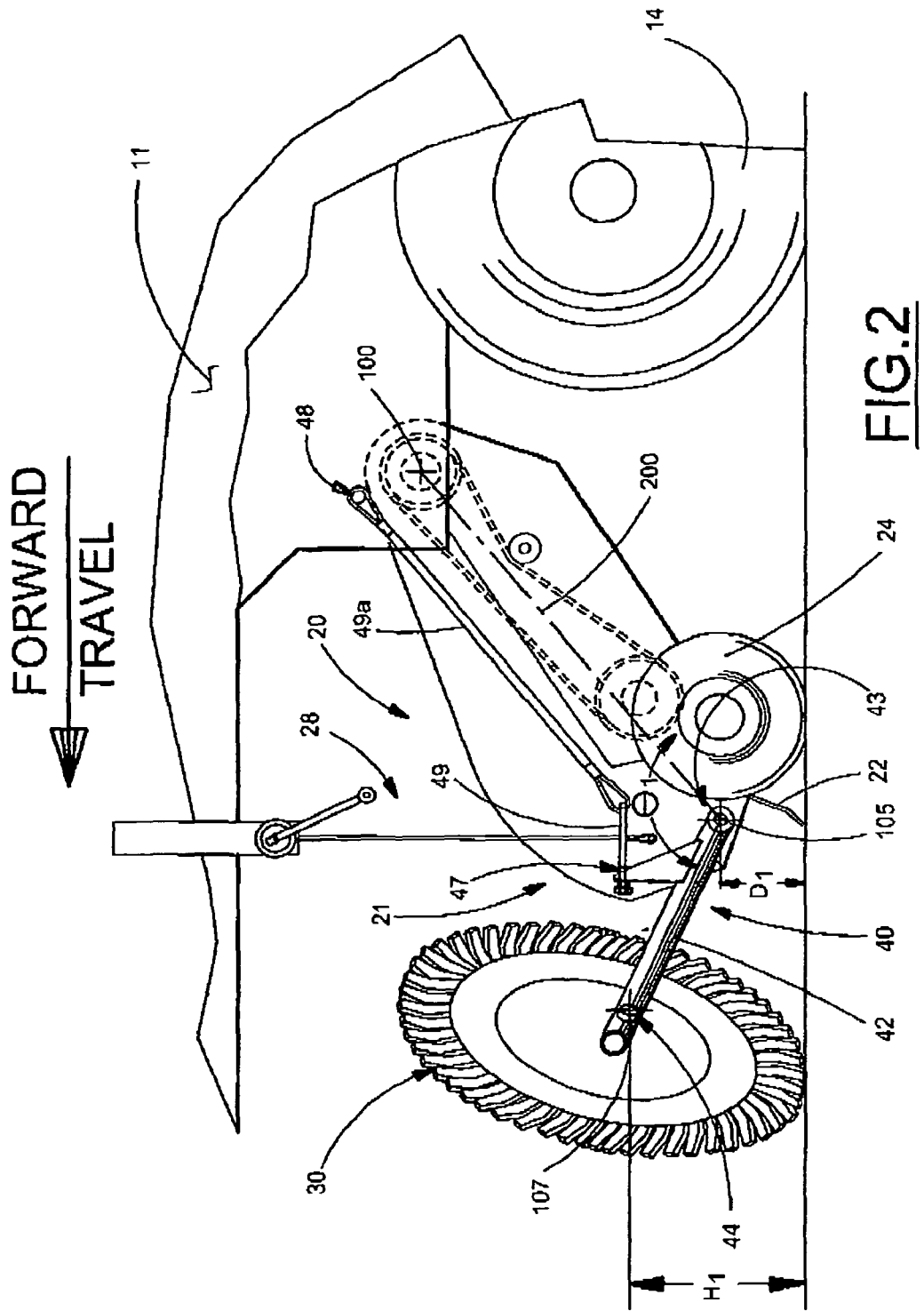
FIG. 2 is a side view of the pick-up assembly on the round baler of FIG. 1 illustrating one embodiment of the present mechanism for adjusting a crop gathering wheel height, shown in a normal operating position of the pick-up assembly.

Referring now to FIG. 2, the mechanism 40 for connecting the gathering wheel 30 to the pick-up assembly 20 is shown comprising a swing arm 42 having a pivot connection 43 at one end for connection to the pick-up assembly 20 at pivot axis 105 near the forward or free end 21 of the pick-up assembly. A hub 44 connected to the opposite end of the swing arm provides a rotating connection for the gathering wheel 30 to the swing arm 42 and allows the gathering wheel to rotate about gathering axis 107. Swing arm 42 may be biased by a spring or the like to maintain the gathering wheel in contact with the ground or its lowest operating position as the baler moves across the ground. Alternatively, the weight of the gathering wheel and swing arm assembly also tends to keep the gathering wheel in contact with the ground or its lowest operating position provided the swing arm remains generally unrestrained.

A lift member 49 is connected to the swing arm 42 at a first lift mount connection 47 on the swing arm 42 and to the frame 11 of the baler at a second lift mount connection 48. As is illustrated in FIG. 2, the lift member 49 is configured to allow the gathering wheel 30 to rest on the ground or be suspended slightly above the ground when the pick-up assembly is lowered to an operating position. The arrangement orients the swing arm 42 at an angle $\Theta_1$ measured from a line 200 extending from the pick-up pivot axis 100 to the swing arm pivot axis 105.

Referring to FIG. 3, the pick-up assembly 20 is shown in a non-operational raised position as would be necessary to transport the baler over the road. In this orientation, the free end 21 of the pick-up assembly opposite of the pick-up pivot axis 100 is vertically elevated by an amount necessary to provide clearance underneath for road transport, shown as distance equal to $D_2-D_1$ in FIGS. 2 and 3. The extent of upward movement of the pick-up assembly 20 is limited by overhead clearance with the frame 11. Further limitation on upward movement would be caused by the gathering wheel 30 if the position of the gathering wheel relative to the pick-up assembly 20 remained unchanged from the operational position shown in FIG. 2 and was also elevated by a distance equal to $D_2-D_1$. As the pick-up assembly is raised, the lift member 49 allows the swing arm to pivot to a lesser degree than the pivoting of the pick-up assembly 20. The result is that the angle of the swing arm $\Theta_2$ measured from a line 200 extending from the pick-up pivot axis 100 to the swing arm pivot axis 105 is greater than the angle $\Theta_1$ measured in the operating condition. This is also illustrated in FIGS. 2 and 3 in which the net elevation of the pick-up assembly is shown as $D_2-D_1$ and the net elevation of the gathering wheel is shown as $H_2-H_1$. The mechanism 40 causes $(D_2-D_1)$ to be greater than $(H_2-H_1)$.

By varying the relative positions of the pick-up pivot axis 100, the first lift mount connection 47 and the second lift mount connection 48, the differential rate of elevation between gathering wheel movement and pick-up assembly movement can be selectively altered. The preferred arrangement allows the uppermost portion(s) of the pick-up assembly 20 and the top of the gathering wheel 30 to contact the frame 11 generally simultaneously. Adjustment of the mount connections also enables gathering wheels of different diameters to utilize a common support mechanism 40 to improve manufacturing efficiency. It is also possible to utilize a means to vary the effective length of lift member 49 to enable the differential rate of elevation between gathering wheel movement and pick-up assembly to be fine-tuned as relocation of the lift mount connections 47, 48 may not be easily accomplished within manufacturing limitations. Such alternate means are discussed further in connection with FIG. 6 hereinafter.

Movement of the gathering wheel support mechanism 40 as the baler traverses uneven terrain is illustrated in FIGS. 4 and 5. The support mechanism 40 is further improved by replacing a portion of structurally rigid lift member 49 (e.g. steel rod, tube, or structural shape) with a tension-only element 49a, such as a cable or chain. A tension-only member 49a allows up-lift of the gathering wheel 30, such as is illustrated in FIG. 4, without damaging the lift member 49 or pick-up assembly 20. Use of a tension and compression resistant structure for the lift member 49 fixes the vertical position of the gathering wheel to the pick-up assembly and causes both to move according to the differential rate determined by the support mechanism 40 geometry without regard to terrain undulations.

Figure 6:
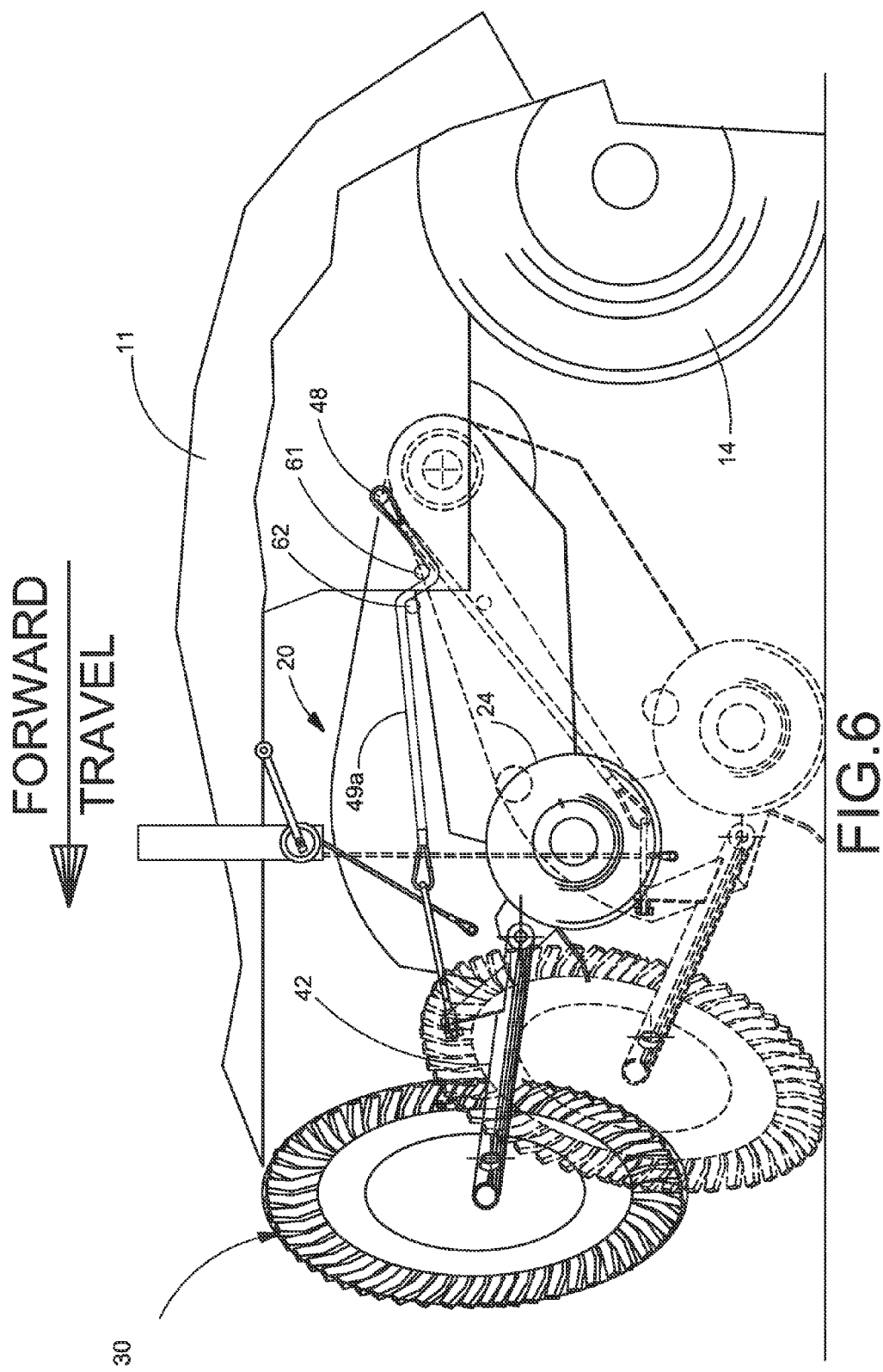
FIG. 6 is a side view of the pick-up assembly illustrating an adjustment mechanism for varying the relative rate of elevation of the gathering wheel to the pick-up assembly.

Adjusting the relative rate of gathering wheel to pick-up assembly rise is illustrated in FIG. 6 wherein one or more fulcrum stops 61, 62 are provided in the arc path of the tension-only element 49*a*. As the pick-up assembly is raised, the tension-only element 49*a* first comes into contact from below with the lower portion of first fulcrum stop 61 which is connected to the baler chassis 11. Continued elevation of the pick-up assembly forces the tension-only element to be deflected by the fulcrum stop 61, effectively shortening the lift member 49 length between the first and second lift mount connections 47, 48 and increasing the up-lift rate of the gathering wheel relative to the pick-up assembly. A second fulcrum stop 62 connected to the pick-up assembly contacts the tension-only element upon further elevation of the pick-up assembly. The upper portion of the second fulcrum stop 62 approaches the tension-only element 49*a* from below, forcing the tension-only element into a second deflection, further shortening the effective length of the tension-only element 49*a*. Once the tension-only element 49*a* has contacted both fulcrum stops 61, 62, further elevation of the pick-up assembly will continue to shorten the effective length of the tension-only element 49*a* and increase the ration of gathering wheel height elevation to pick-up assembly height elevation. While the above description indicates that the tension-only element 49*a* initially contacts the first fulcrum stop 61, the second fulcrum stop 62 may initially come into contact with the tension-only element 49*a* or both fulcrum stops 61, 62 may contact the element 49*a* simultaneously depending on the specific placement of the fulcrum stops in relation to the path of the tension-only element 49*a*.

Placement of the fulcrum stops 61, 62 may be easily varied to refine the total gathering wheel elevation compared to the total pick-up assembly elevation so that both may simultaneously reach an apex just beneath the overhead portion of the baler frame 11 thereby maximizing ground clearance beneath. Movement of the fulcrum stops 61, 62 is typically more easily accomplished than repositioning the either the first or second lift mount connections 47, 48 as these may be optimized for gathering wheel elevation control when the pick-up assembly is in the operating position. The incorporation of readily re-positionable fulcrum stops enables gathering wheel lift to be fine-tuned for specific baler frame configurations with minimal impact on machine production.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A gathering wheel height adjustment mechanism for a baler comprising:
   a moveable crop pick-up assembly pivotally coupled to the baler along a generally transversely aligned pivot end and having a free end spaced apart from said pivot end, said pick-up assembly being pivotally moveable between raised and lowered positions, said pick-up assembly pivotal movement causing vertical displacement of said free end;
   an elongate swing arm connected at a first end to the pick-up assembly adjacent to the free end, and having a rotatable connection to a crop gathering wheel at a generally opposing second end, said swing arm pivotally moveable between generally opposing first and second positions, said swing arm pivotal movement causing vertical displacement of said gathering wheel; and
   an elongate lift member interconnecting said swing arm and a frame of the baler, wherein the lift member and swing arm are configured to adjust the vertical height of the gathering wheel with respect to the vertical height of the pickup as the pickup assembly is moved toward the raised position; and
   at least one fulcrum stop positioned to contact said lift member during upward movement of said pick-up assembly wherein the at least one fulcrum stop is located in the upward path of movement of the lift member and contact between the lift member and the at least one fulcrum stop increases increasing the rate of vertical movement of said crop gathering wheel from a first speed to a second speed.

2. The mechanism of claim 1 wherein the vertical displacement of said crop gathering wheel relative to the vertical displacement of said free end of said pick-up assembly as said pick-up assembly is pivoted toward said raised position is adjustable by variation in position of at least one of said lift member interconnections to said baler or said pick-up assembly.

3. The mechanism of claim 2, wherein said lift member includes a tension-only structural element thereby enabling upward vertical displacement of said crop gathering wheel without upward vertical displacement of said pick-up assembly free end.

4. The mechanism of claim 3, wherein said tension-only structural element is a cable or chain.

5. The mechanism of claim 3, wherein said pick-up assembly is laterally bounded by generally opposing first and second outboard ends and said first end of said swing arm is connected adjacent to said first outboard end.

6. The mechanism of claim 1, wherein said at least one fulcrum stop further comprises a first fulcrum stop connected to the baler frame and a second fulcrum stop connected to the pick-up assembly.

7. A crop gathering wheel assembly agricultural baler, the baler having a frame for supporting the pick-up assembly, the frame extending generally above the pick-up assembly, said mechanism comprising:
   a swing arm pivotally connected to the pick-up assembly at a first end and connected to a crop gathering wheel at a generally opposing second end, said swing arm pivotally moveable between generally opposing first and second positions, said swing arm pivotal movement causing vertical displacement of said gathering wheel; and
   an elongate lift member interconnecting said swing arm and the frame of the baler, wherein the lift member is configured to adjust the vertical movement of the crop gathering wheel with respect to the vertical movement of the pickup as the pickup assembly is moved and;
   at least one fulcrum stop positioned to contact said lift member during upward movement of said pick-up assembly wherein the at least one fulcrum stop is located in the upward path of movement of the lift member and contact between the lift member and the at least one fulcrum stop increases increasing the rate of vertical movement of said crop gathering wheel from a first speed to a second speed.

8. The assembly of claim 7, wherein said lift member includes a tension-only structural portion.

9. The assembly of claim 7, wherein said at least one fulcrum stop further comprises a first fulcrum stop connected to the baler frame and a second fulcrum stop connected to the pick-up assembly.

10. The assembly of claim 8, wherein said tension-only structural portion is a cable or a chain.

11. A crop gathering wheel mechanism for crop pick-up assembly on a round baler, the pick-up assembly connected to a baler frame and moveable between raised and lowered positions, the-mechanism comprising:
  an elongate swing arm having generally opposing first and second ends connected to the pick-up assembly and moveable therewith, said swing arm being pivotally coupled to the pick-up assembly at said first end and rotatably connected to the crop gathering wheel at said second end, said swing arm pivotally moveable between generally opposing first and second positions, said pivotal movement causing vertical displacement of said gathering wheel; and
  an elongate lift member interconnecting said swing arm and the frame of the baler wherein the lift member is configured to adjust the vertical height of the crop gathering wheel with respect to the vertical height of the pickup when the pickup assembly is moved such that the vertical displacement of said first end of said swing arm is greater than the vertical displacement of said second end of said swing arm as the pick-up assembly is moved from lowered to said raised positions and said lift member includes a tension-only structural portion thereby enabling upward vertical displacement of said crop gathering wheel connected at said second end without upward vertical displacement of said swing arm first end; and
  at least one fulcrum stop positioned to contact said tension-only structural portion during upward movement of said pick-up assembly causing a deflection of said tension-only structural element thereby increasing the vertical movement of said crop gathering wheel relative to the pick-up assembly vertical movement.

12. The mechanism of claim 11, wherein the vertical displacement of said first end of said swing arm relative to the vertical displacement of said second end of said swing arm as the pick-up assembly is moved between said lowered and said raised positions is adjustable.

13. The mechanism of claim 11, wherein said at least one fulcrum stop further comprises a first fulcrum stop connected to the baler frame and a second fulcrum stop connected to the pick-up assembly.

14. The mechanism of claim 11, wherein said tension-only structural portion is a cable or a chain.

* * * * *